United States Patent

[11] 3,618,082

[72] Inventor Roger J. Feulner
Mount Prospect, Ill.

[21] Appl. No. 814,702
[22] Filed Apr. 9, 1969
[45] Patented Nov. 2, 1971

[73] Assignee Honeywell Inc.
Minneapolis, Minn.

[54] INFORMATION RETRIEVAL SYSTEM WITH A REMOTE STATION HOLD CIRCUIT TO PRESERVE A DOUBLE CHANGE IN STATUS
8 Claims, 2 Drawing Figs.

[52] U.S. Cl. .......... 340/413, 340/164
[51] Int. Cl. .......... G08b 23/00, G08b 29/00, G08b 26/00
[50] Field of Search .......... 340/413, 412

[56] References Cited
UNITED STATES PATENTS

| | | | |
|---|---|---|---|
| 2,901,739 | 8/1959 | Freitas .......... | 340/413 |
| 2,939,123 | 5/1960 | Bell .......... | 340/413 |
| 3,087,144 | 4/1963 | Bianchi .......... | 340/413 |
| 3,109,929 | 11/1963 | Picard .......... | 340/413 |

*Primary Examiner*—Thomas B. Habecker
*Attorneys*—Lamont B. Koontz, Francis A. Sirr and Clyde C. Blinn

ABSTRACT: An information retrieval system having a central processor unit which is connected over a transmission circuit to a plurality of remote stations wherein the status of any one of the remote stations which has a change in status can be indicated or read out at the central processor unit. Each remote station has means for preserving a second change in status signal at a remote station until a first change in status is acknowledged by the central processor.

PATENTED NOV 2 1971 3,618,082

INVENTOR.
ROGER J. FEULNER
BY Clyde C. Blinn
ATTORNEY

INFORMATION RETRIEVAL SYSTEM WITH A REMOTE STATION HOLD CIRCUIT TO PRESERVE A DOUBLE CHANGE IN STATUS

BACKGROUND OF THE INVENTION

In a copending Troy L. Pegram U.S. Pat. No. 3,573,733 a central processor unit is connected to a plurality of remote stations whereby upon a change in status of a SWITCH, from an open status to a closed status or vice versa, at any one of the remote stations, a change in status signal appears as an output signal and the central processor seeks out the remote station having the output signal. Upon a change in status output signal occurring, the central processor reads out the present status of the switch at that remote station and then resets the station to the normal position. If the remote station switch should change status twice before the central processor reads out the status of the switch, the central processor will only be informed of a single change in status signal and will read out the present status of the switch. The fact that a double change in status took place will be lost.

SUMMARY OF THE INVENTION X

The present invention is concerned with an information retrieval system for indicating and recording at a central processor unit a change in status and the present status of each of a plurality of remote station switches with means to preserve an indication of when any one of the switches has changed status twice.

Specifically, upon a change in the status of a switch at a remote station, a change of status signal is generated to indicate to the central processor unit that the particular station has changed status. Before the station is read out, the change of status circuit is rendered ineffective of producing an output upon a second change in status until after the first change in status is acknowledged and the station is read out. More specifically, the remote station has a "freeze" circuit which is energized by the central processor unit to prevent a second change in the status from providing a change in status signal until the "freeze" circuit is subsequently "unfrozen."

DESCRIPTION

Figure 1:
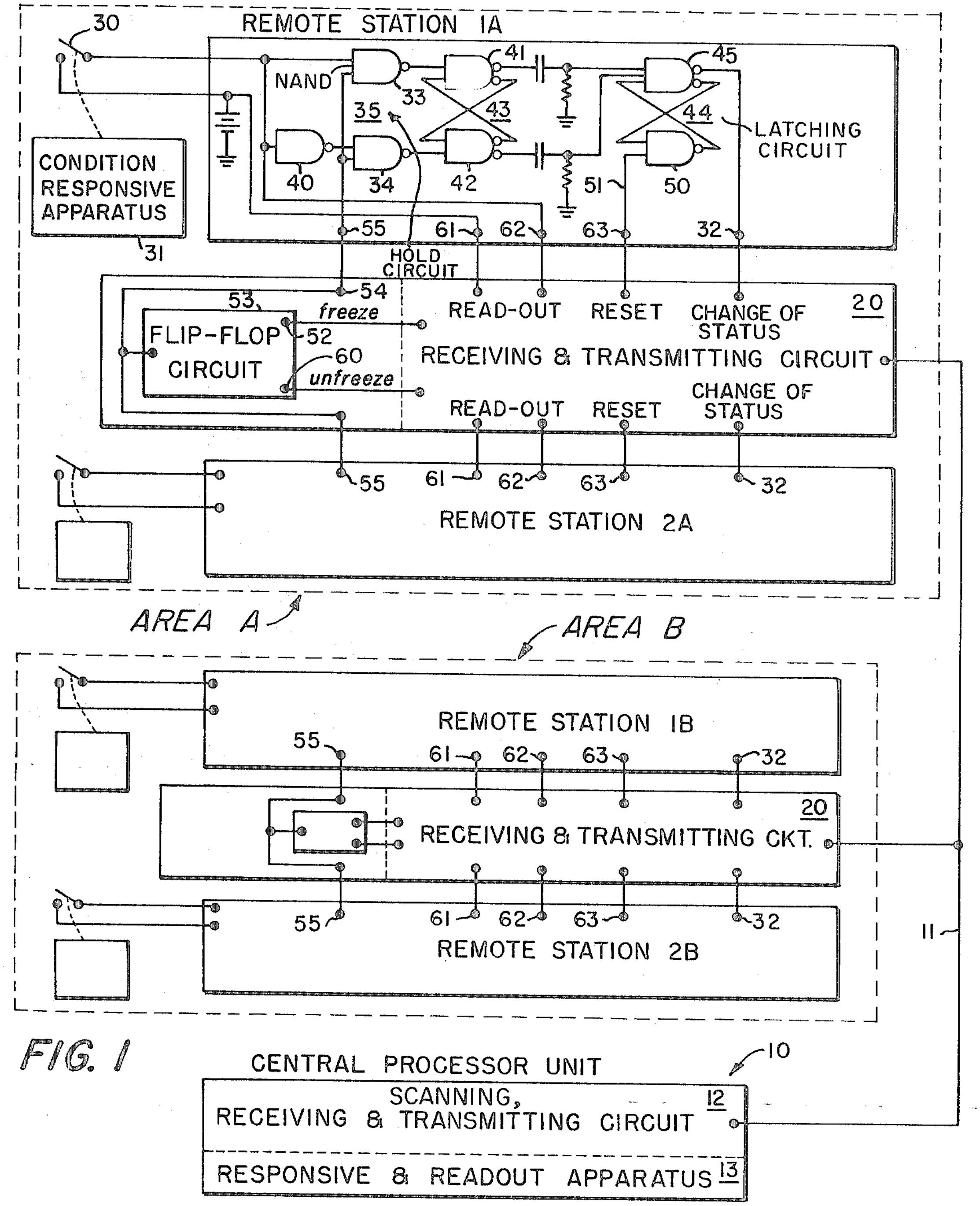
FIG. 1 is a schematic representation of an information retrieval system having a central processor unit connected by a transmission circuit to a plurality of remote stations. The specific circuit for the remote stations is shown in detail at remote station 1A.

Referring to FIG. 1, an information retrieval system is shown having a central processor unit or central station 10 which is connected to a plurality of remote stations over a transmission circuit 11. The central processor unit comprises a scanning receiving and transmission circuit 12 and a status-responsive and readout apparatus 13. Apparatus 13 might be a conventional printer or typewriter for printing information which is received by the central processor unit from the remote stations.

The central processor unit is used to retrieve information from the control apparatus in various areas of a building, such as areas A and B, and each area of the building contains a plurality of remote stations, such as 1A and 2A of area A and 1B and 2B of area B. The receiving and transmitting circuit 12 is capable of sending addressed coded signals or messages from the central processor unit to accomplish certain operations at the remote stations in areas A and B over receiving and transmitting circuits 20 and the remote stations can send back to the central processor unit identified messages which contain information obtained at the remote stations. The type of transmissions by circuits 12 and 20 over circuit 11 forms no part of the present invention and would be obvious to one skilled in the art such as the system disclosed in the U.S. Pat. No. 3,408,626.

As each of the remote stations is similarly constructed, an explanation of remote station 1A will suffice for the other remote stations. Connected to the input of remote station 1A is a detector or switch 30 which can change position or status to be closed for alarm or opened for normal by a condition responsive apparatus 31. When switch 30 operates, either from an open to a closed position or status or from a closed to an open status, a change of status takes place to generate or produce an output over circuit 32. Specifically, when the switch 30 changes status, the voltage level to the input of a pair of NAND-gates 33 and 34 in a hold or freeze circuit 35 changes. The input to NAND-gate 34 is inverted by an inverter 40. The output of gates 33 and 34 is connected to the input of another pair of NAND-gates 41 and 42 of a flip-flop circuit 43 which provides an output to a resettable latching circuit 44 having a NAND-gate 45 for providing the change of status output signal on circuit 32. Once an output is fed into circuit 44 by the operation of flip-flop circuit 43, circuit 44 is latched and the signal on circuit 32 remains until an unlatching or reset signal is impressed on NAND-gate 50 over a resetting circuit 51 which would restore latching circuit 44 to an initial standby condition with no output signal on circuit 32.

Upon an operation of switch 30 a change of status signal appears on circuit 32. When the central processor unit addresses the stations of area A to have the stations report through receiving and transmitting circuit 20, a signal is impressed on circuit 52 to freeze circuit 35 to operate or latch a conventional flip-flop circuit 53 having an output over circuit 54 to input 55 of the freeze circuit 35 of all associated stations in area A. The receiving and transmitting circuit 20 responds to any change of status signals occurring on circuit 32 from the remote stations in area A and as previously mentioned, an output signal exists on circuit 32 of remote station 1A as a result of the closing of switch 30. This change of status as well as the present status or position of switch 30, which will be read out over circuits 61 and 62, will be transmitted in a message to the central processor unit to be printed out by apparatus 13.

If during the scanning or reporting operation by circuit 20 of the remote stations in area A, a second operation or change in status of switch 30 of remote station 1A takes place and the switch 30 returns to the normal open position, the second operation of switch 30 will not effect the output of freeze circuit 35. After the central processor has completed its readout of the stations of area A, the central processor would move to area B by addressing the stations of area B and the receiving and transmitting circuit 20 of area A upon receiving the messages addressed to area B would first reset the circuits 44 of the remote stations in area A by a signal on circuit 63 and then unfreeze circuit 35 of the remote stations in area A by an unfreeze signal over circuit 60. At that time, the second operation of switch 30 of remote station 1A, which had previously taken place, results in the operation of flip-flop circuit 43 to again latch circuit 44 and provide another change of status signal on circuit 32. When the central processor unit has completed its retrieval of information from the remote stations of area B, the central processor unit would again address the stations of area A and upon receiving the address message from the central processor unit circuit 20 of area A would first provide a freeze signal on circuit 52 to freeze circuit 35 before again responding to the presence of any change of status signals on circuits 32 and reading out the present position of the switch on circuits 61 and 62. As remote station 1A has now an output signal on circuit 32 due to the second operation of switch 30, the central processor unit would respond to this change of status signal and read out the present switch position as an open position or returning to normal.

Figure 2:
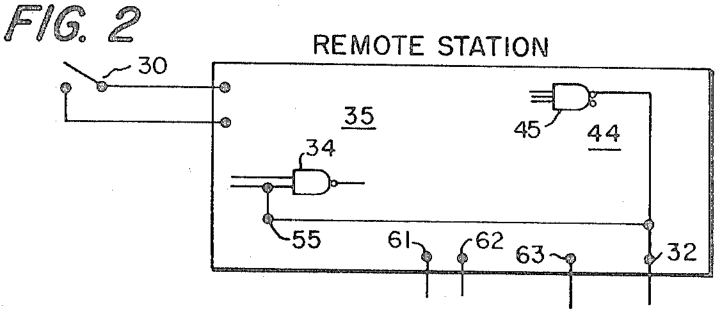
FIG. 2 is a specific circuit for another embodiment of a remote station.

While the freeze operation of circuit 35 is shown in FIG. 1 to be accomplished by the central processor when the stations of that particular area are addressed through the receiving and transmitting circuit 20 to provide the freeze signal on circuit 52, the freeze signal to freeze circuit 35 could be obtained directly from the output circuit 32 as shown in FIG. 2. With such an embodiment, upon the occurrence of a first operation of switch 30 to the closed position, circuit 44 would be latched to provide an output on circuit 32 indicative of the change of status and the output on circuit 32 would be impressed upon circuit 55 to freeze circuit 35 so that a second operation of switch 30 to the open position, which would occur shortly after the first operation, would not affect the output of circuit 35 and be preserved until circuit 44 was unlatched or unfrozen as previously described by a signal on circuit 63 to remove the signal from circuit 55 to freeze circuit 35.

OPERATION OF THE SYSTEM

The central processor unit continually retrieves information from the remote stations of area A and area B of the building. Each time the central processor addresses the receiving and transmitting circuit 20 of area A, the remote stations of area A are frozen and the remote stations of the previously interrogated stations of area B are reset and unfrozen. The stations of area A then report to the central processor any change in status and the present status. After all of the stations of area A have reported and the necessary checks have been made, the central processor unit addresses the stations of area B through circuit 20 to freeze the stations of area B and reset and unfreeze the stations of area A.

The specific operation of the system for a double operation of switch 30 is as follows. Assuming switch 30 of station 1A moved from a normal open position to a closed alarm position, a change of status signal is provided on circuit 32. Upon the central processor addressing the stations of area A, circuit 35 is frozen by freeze signal on circuit 52. Each of the stations of area A reports to the central processor unit and station 1A having a change in status signal reports a change of status and the present status of switch 30 which is read out over circuits 61 and 62. The central processor unit prints out as follows:

1A Alarm

While the stations of area A are reporting any change of status and the present status to the central processor, switch 30 of station 1A returns to the normal open position. Since circuit 35 is frozen, the second change in status of switch 30 has no effect upon the output of circuit 35.

After the completion of the information retrieval from the area A and the time to accomplish whatever checks are necessary for the central processor unit, the central processor addresses the stations of area B and circuit 20 of area A upon receiving the coded message sent to area B resets all of the stations of area A by a signal over circuit 63 to unlatch circuit 44 to remove the change of status signal and unfreeze the stations of area A by an unfreeze signal on circuit 60. The second operation of switch 30 to the normal open position causes the flip-flop circuit 43 to operate latching circuit 44 and provides a new change of status signal on circuit 32.

Upon a subsequent addressing of the stations in area A by the central processor unit to have the station 1A report the second change in status and the present status of switch 30, apparatus 13 in the central processor prints out as follows:

1A Return to Normal

As the transmission rate and the retrieving rate of information over a system of this type is quite fast, the printer would actually print the above-mentioned information for the double operation of switch 30 close together as follows:

1A Alarm

1A Return to Normal

The human operator at the central processor unit is informed of a change of status even though a double change of status occurs before the first change is acknowledged by the central processor unit.

The embodiments of the invention in which an exclusive property or right is claimed are defined as follows:

1. A system comprising:

a plurality of remote stations each comprising:

condition-responsive means operable between a first and second status and between said second and said first status, latching circuit means connected to said condition-responsive means for providing an output signal upon an operation of said condition-responsive means from one status to the other, hold circuit means connecting said latching circuit means to said condition-responsive means for selectively rendering said latching circuit means nonresponsive to a second operation of said condition-responsive means from said other status to said one status after first operating from said one to said other status to produce said output signal, transmission circuit means:

a central position comprising:

scanning circuit means connecting said central station to each of said remote stations over said transmission circuit means, and status-responsive means, circuit means including said scanning circuit means and said transmission circuit means for connecting said status-responsive means to said condition-responsive means of the remote station having said output signal to have said central station respond to the status of said condition-responsive means, and control circuit means at said remote station connected to said hold circuit means for controlling said hold circuit means.

2. In the system of claim 1 wherein, said latching circuit means provides a change of status output signal when said condition-responsive means operates from said one status to said other.

3. In the system of claim 1 wherein, said latching circuit means comprising a resettable latching circuit means for providing said change of status output signal when energized to a latched state, and comprising;

circuit means associated with said scanning circuit means for providing a reset signal for unlatching said latching circuit means after the status responsive means has responded to the status of said condition-responsive means.

4. The system of claim 1 wherein said condition-responsive means comprises detector means having a first and second state of operation, said latching circuit means having a first and second state of operation corresponding to said first and second state of operation of said detector means, having an output signal upon said latching circuit means changing from one state to the other, and having circuit means connected to said hold circuit means to hold said latching circuit means in a state of operation upon the occurrence of said output signal, and said control means being controlled by said scanning means and effective to control said hold circuit means to hold said latching circuit means after the state of said detector means has been responded to by said status responsive means.

5. In the system of claim 1 wherein:

said hold circuit means comprising:

a pair of NAND gates each having two input circuits and an output circuit, a signal source, and means connecting said condition-responsive means to one input of one of said NAND gates and connecting said condition-responsive means to one input of the other of said NAND gates through an inverter means to provide a signal on said output when said condition-responsive means operates to one status, and wherein said hold circuit means comprises:

means connecting said second input circuits of each of said NAND gates to said signal source to render said hold circuit means effective to prevent a change of said signal on said output until said signal source is removed.

6. In the system of claim 6 wherein, said latching circuit means has a flip-flop circuit and a latching circuit connected to said output of said pair of NAND gates whereby upon said condition-responsive means first changing status, the signal on said output of said pair of NAND gates changes to operate said flip-flop circuit and said latching circuit to provide said output signal.

7. The system of claim 1 wherein said scanning means of said central station scans said plurality of remote stations to respond to a station having an output signal indicating a change of status of said condition-responsive means and after said status-responsive means responds to said status of said condition-responsive means, said central station energizes said control circuit means to render said hold circuit means ineffective whereby if a second change of status had taken place a subsequent output signal is produced whereby said central station responds to said subsequent output signal indicating a subsequent change in status of said condition-responsive means.

8. In the system of claim 1 wherein, said hold circuit means is connected to said latching circuit means to respond to an output signal upon said condition-responsive means operating from said one status to said other status.

* * * * *